United States Patent
Kiely (10) Patent No.: US 9,318,142 B2
(45) Date of Patent: Apr. 19, 2016

(54) LASER MODULATION FOR MAGNETIC RECORDING APPARATUS

(71) Applicant: Seagate Technology LLC, Cupertino, CA (US)

(72) Inventor: James Dillon Kiely, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/794,700

(22) Filed: Mar. 11, 2013

(65) Prior Publication Data

US 2013/0286802 A1    Oct. 31, 2013

Related U.S. Application Data

(60) Provisional application No. 61/638,263, filed on Apr. 25, 2012.

(51) Int. Cl.
| | |
|---|---|
| G11B 11/00 | (2006.01) |
| G11B 13/04 | (2006.01) |
| G11B 5/31 | (2006.01) |
| G11B 5/60 | (2006.01) |
| G11B 5/00 | (2006.01) |

(52) U.S. Cl.
CPC ............... G11B 13/04 (2013.01); G11B 5/314 (2013.01); G11B 5/3133 (2013.01); G11B 5/607 (2013.01); G11B 2005/0021 (2013.01)

(58) Field of Classification Search
CPC .............................................. G11B 2005/0032
USPC ........... 369/13.33, 13.13, 13.32, 13.26, 13.27
See application file for complete search history.

(56) References Cited

U.S. PATENT DOCUMENTS

| | | | |
|---|---|---|---|
| 6,233,206 B1 * | 5/2001 | Hamann et al. ............ | 369/13.01 |
| 6,762,977 B1 | 7/2004 | Gage et al. | |
| 6,950,267 B1 | 9/2005 | Liu et al. | |
| 6,965,622 B1 | 11/2005 | Cho et al. | |
| 7,317,665 B2 * | 1/2008 | Watanabe et al. .......... | 369/13.33 |
| 7,345,840 B2 | 3/2008 | Gomez et al. | |
| 7,349,170 B1 | 3/2008 | Rudman et al. | |
| 7,538,978 B2 | 5/2009 | Sato et al. | |
| 7,542,228 B2 | 6/2009 | Knigge et al. | |

(Continued)

FOREIGN PATENT DOCUMENTS

| | | |
|---|---|---|
| JP | 2003509795 | 3/2003 |
| JP | 2011258255 | 12/2011 |

(Continued)

OTHER PUBLICATIONS

Mar. 23, 2015, File History for U.S. Appl. No. 13/802,386.

(Continued)

Primary Examiner — Tan X Dinh
(74) Attorney, Agent, or Firm — Hollingsworth Davis, LLC (57) ABSTRACT

A transducer comprises a slider and a laser arrangement. The laser arrangement is configured to heat a region of a magnetic medium in proximity to the slider and produce modulated laser light to cause heat-induced modulation of the slider. The laser arrangement is configured to couple laser light at a power that reduces a coercivity of magnetic material at the region for writing data to or erasing data at the region, and couple modulated laser light to cause heat-induced modulation of the slider at a power lower than the power for writing data to or erasing data at the magnetic medium.

24 Claims, 10 Drawing Sheets

(56) References Cited

U.S. PATENT DOCUMENTS

| | | |
|---|---|---|
| 7,626,894 B2 | 12/2009 | Bedillion et al. |
| 7,796,353 B2 * | 9/2010 | Schabes et al. ............ 369/13.33 |
| 7,796,356 B1 | 9/2010 | Fowler et al. |
| 7,804,656 B2 | 9/2010 | Gomez et al. |
| 8,149,541 B2 | 4/2012 | Baumgart |
| 8,149,653 B2 | 4/2012 | Shimazawa et al. |
| 8,248,895 B2 | 8/2012 | Shimazawa et al. |
| 8,248,897 B2 | 8/2012 | Shimazawa et al. |
| 8,310,902 B1 | 11/2012 | Contreras et al. |
| 8,315,128 B1 | 11/2012 | Wilson et al. |
| 8,339,905 B2 | 12/2012 | Rausch et al. |
| 8,908,480 B1 * | 12/2014 | Krichevsky ................ 369/13.13 |
| 2002/0176452 A1 | 11/2002 | Lin et al. |
| 2005/0265139 A1 | 12/2005 | Gomez et al. |
| 2006/0187564 A1 | 8/2006 | Sato et al. |
| 2006/0203862 A1 | 9/2006 | Bonen et al. |
| 2006/0233061 A1 | 10/2006 | Rausch et al. |
| 2006/0233062 A1 | 10/2006 | Bedillion et al. |
| 2006/0239313 A1 | 10/2006 | Hosking |
| 2007/0058686 A1 * | 3/2007 | Capasso et al. ............ 372/43.01 |
| 2007/0230012 A1 * | 10/2007 | Erden et al. .................... 360/75 |
| 2008/0117727 A1 * | 5/2008 | Matsumoto ................ 369/13.33 |
| 2008/0123219 A1 | 5/2008 | Gomez et al. |
| 2008/0225426 A1 | 9/2008 | Roy et al. |
| 2009/0225464 A1 | 9/2009 | Juang et al. |
| 2010/0002330 A1 | 1/2010 | Lille |
| 2010/0007980 A1 | 1/2010 | Kim et al. |
| 2010/0232067 A1 | 9/2010 | Liners et al. |
| 2010/0271910 A1 * | 10/2010 | Boutaghou ................ 369/13.33 |
| 2011/0026156 A1 | 2/2011 | Shimazawa et al. |
| 2011/0205861 A1 * | 8/2011 | Erden et al. ................ 369/13.33 |
| 2011/0228649 A1 | 9/2011 | Shimazawa et al. |
| 2011/0228650 A1 | 9/2011 | Shimazawa et al. |
| 2011/0228653 A1 | 9/2011 | Shimazawa et al. |
| 2011/0299367 A1 | 12/2011 | Naniwa et al. |
| 2012/0113207 A1 | 5/2012 | Zheng |
| 2012/0201108 A1 | 8/2012 | Zheng et al. |
| 2012/0300599 A1 | 11/2012 | Contreras et al. |
| 2012/0327752 A1 | 12/2012 | Snyder |
| 2013/0107390 A1 | 5/2013 | Huang et al. |
| 2013/0107680 A1 | 5/2013 | Contreras et al. |
| 2013/0176836 A1 * | 7/2013 | Zheludev et al. .......... 369/13.33 |
| 2013/0265860 A1 | 10/2013 | Gage et al. |

FOREIGN PATENT DOCUMENTS

| | | |
|---|---|---|
| JP | 2012104213 | 5/2012 |
| JP | 2012248266 | 12/2012 |
| WO | WO2012068399 | 5/2012 |

OTHER PUBLICATIONS

Office Action dated Jan. 13, 2015 from Japanese Application No. 2014-048821, 3 pages.

Office Action dated Apr. 21, 2015 from Korean Application No. 10-2014-0026643, 6 pages.

File History for U.S. Appl. No. 13/802,386 as was retrieved from the U.S. Patent and Trademark Office on Sep. 2, 2015, 129 pages.

* cited by examiner

LASER MODULATION FOR MAGNETIC RECORDING APPARATUS

RELATED PATENT DOCUMENTS

This application claims the benefit of Provisional Patent Application Ser. No. 61/638,263 filed on Apr. 25, 2012, to which priority is claimed pursuant to 35 U.S.C. §119(e) and which is hereby incorporated herein by reference in its entirety.

SUMMARY

Embodiments of the disclosure relate to apparatuses and methods for causing a structure of a transducer to modulate using heat produced using an optical energy source. Embodiments of the disclosure relate to apparatuses and method for causing heat-induced modulation of a structure of a transducer at a desired frequency using heat produced using an optical energy source.

In accordance with various embodiments, an apparatus comprises a transducer and a laser arrangement configured to cause heat-induced modulation of a component of the transducer. In other embodiments, an apparatus comprises a transducer having a slider, and a laser arrangement configured to cause heat-induced modulation of the slider.

According to further embodiments, an apparatus comprises a transducer having a slider, and a laser arrangement configured to heat a region of a magnetic medium in proximity to the slider and produce modulated laser light to cause heat-induced modulation of the slider. In some embodiments, the laser arrangement is configured to couple laser light at a power that reduces a coercivity of magnetic material at the region for writing data to or erasing data at the region, and couple modulated laser light to cause heat-induced modulation of the slider at a power lower than the power for writing data to or erasing data at the magnetic medium.

In accordance with other embodiments, a method involves heating a component of a transducer using laser light as an energy source for the heating, and modulating the laser light to cause heat-induced modulation of the component. Some embodiments involve heating a slider of the transducer, and modulating the laser light to cause heat-induced modulation of the slider.

These and other features and aspects of various embodiments may be understood in view of the following detailed discussion and accompanying drawings.

DETAILED DESCRIPTION

The present disclosure generally relates to magnetic recording devices used for data storage. Data storage systems may include one or more transducers that respectively write (e.g., a writer) and read (e.g., a reader) information to and from a magnetic storage medium. It is typically desirable to have a relatively small distance or separation between a transducer and its associated media. This distance or spacing is referred to herein as "head-media separation" (HMS). By reducing the head-media separation, a reader and a writer is generally better able to both write and read data to and from a medium. Reducing the head-media separation also allows for surveying of magnetic storage medium topography, such as for detecting asperities and other features of the recording medium surface.

Various embodiments involve heat-assisted magnetic recording (HAMR) recording. In HAMR systems, also sometimes referred to as thermal-assisted magnetic recording (TAMR) systems, a magnetic storage medium (e.g., a hard drive disk) is able to overcome superparamagnetic effects that limit the areal data density of typical magnetic media. In a HAMR recording system, information bits are recorded on a magnetic storage layer at elevated temperatures. The heated area in the storage layer determines the data bit dimension, and linear recording density is determined by the magnetic transitions between the data bits.

In order to achieve desired data density, a HAMR head transducer includes optical components that direct light from a laser to the magnetic storage medium. The HAMR media hotspot may need to be smaller than a half-wavelength of light available from current sources (e.g., laser diodes). Due to what is known as the diffraction limit, optical components cannot focus the light at this scale. One way to achieve tiny confined hot spots is to use an optical near-field transducer (NFT), such as a plasmonic optical antenna. The NFT is designed to reach local surface-plasmon at a designed light wavelength. At resonance, a high electric field surrounds the NFT due to the collective oscillation of electrons in the metal of the NFT. Part of the field will tunnel into the magnetic storage medium and get absorbed, raising the temperature of the medium locally for recording. The increase in local temperature of the medium reduces the coercivity of the magnetic material significantly, preferably to zero, which enables recording of data on high anisotropy magnetic media using fields of relatively low flux density.

An important function of a hard disk drive (HDD), for example, is to accurately set the clearance between the head transducer and the surface of the magnetic storage medium of the HDD. Toward this end, various techniques can be used to detect either proximity or contact between the head transducer and the disk surface. One approach is to measure the amplitude of a pattern written on the magnetic storage medium as the head transducer is brought closer to the disk surface and correlate the increase in read signal amplitude with a decrease in separation. In addition to the spacing change, head-media contact can be detected using this approach, since the amplitude cannot increase once the head transducer is in contact with the disk surface.

It can be advantageous to establish a resonance condition and monitor changes in resonance amplitude or frequency when evaluating head-media separation changes and sensing for head-media contact. One benefit is a high signal-to-noise ratio and, in many cases, a faster response time. In HDD recording systems, for example, vertical motion of the head transducer is required to produce a modulated reader signal, and it is desirable to utilize air bearing resonant modes because these modes cause motion of the various sensors and transducers in the recording system. Specifically, if the vertical mode of the air bearing is excited, for example, the reader, writer, and NFT all undergo an oscillating spacing change, thereby enabling a variety of different methods of measuring the displacement.

However, in HDD recording systems, vertical air bearing resonant modes are purposely difficult to excite. The air bearing is typically designed to be very stiff and to minimize modulation, since such modulation generally negatively impacts recording performance. Other parts of the mechanical system are designed to avoid excitation of air bearing modes. For example, some mechanical structures (e.g., suspension, gimbal, disk, etc.) have resonant modes that intentionally avoid overlapping with air bearing modes, since such mechanical structure resonant modes may excite the air bearing and negatively impact performance. According to some representative HDD recording system implementations, for example, the frequencies of suspension modes are in the range of about 10-20 kHz, and the frequencies of air bearing modes are in the range of about 100-300 kHz.

For active mechanical components, such as heaters and micro-actuated suspensions for example, additional challenges exist. For micro-actuated suspensions, the primary force direction is parallel to the disk surface and has a small impact on head-medium separation. The resonance frequencies for micro-actuated suspensions are typically in the 10-25 kHz range, which is much smaller than air bearing frequencies. Although the heater of a head transducer does provide a means of changing head-media separation, heater time constants are typically about 100-200 microseconds, resulting in a frequency of about 5-10 kHz, which is about 20-30 times lower than air bearing modes.

Embodiments of the disclosure are directed to apparatuses and methods for inducing mechanical modulation of a component of a head transducer. Embodiments of the disclosure are directed to apparatuses and methods for inducing mechanical modulation of a component of a head transducer by inducing protrusion of the component at a high frequency, such as at a mechanical resonant mode of the component. Various embodiments are directed to apparatuses and methods for causing heat-induced mechanical modulation of a head transducer component using modulated laser light as an energy source for the heating.

Various embodiments are directed to apparatuses and methods for causing heat-induced mechanical modulation of a slider of a head transducer using modulated laser light as an energy source for the heating. Embodiments involve tuning the frequency of laser light to cause heat-induced mechanical modulation of the slider at a desired frequency, such as a mode of air bearing resonance. Embodiments also involve monitoring a head-media separation signal, such as a signal produced by a reader or a thermal sensor provided at the head transducer, which provides for measuring of the frequency of air bearing resonance and resonant modes. Other embodiments involve thermally activating a head transducer using laser light energy as the source of heating, such as for changing clearance and head-media separation (HMS).

Heat-induced slider modulation using laser light energy in accordance with various embodiments provides for higher signal-to-noise ratio (SNR) measurements that are faster than conventional techniques. Heat-induced slider modulation using laser light energy in accordance with various embodiments takes advantage of air bearing resonant modes, thereby leveraging efficient energy transfer (e.g., a low input energy can result in a large output amplitude). According to some embodiments, the entire slider advantageously modulates and/or rotates about a nodal line, not just a small heater-induced protrusion area, thereby providing for high SNR measurements. For the vertical mode, both the reader and the writer are subject to modulation. Heat-induced slider modulation using laser light energy can be combined with other existing techniques, such as heater actuation, according to various embodiments.

According to various embodiments, laser light is transmitted through the head transducer in order to heat the magnetic storage medium during write and erase operations. A portion of this light energy is absorbed and converted to heat within the head transducer. This heating results in thermal expansion, protrusion at the air bearing surface, and a change in both head-media clearance and head-media separation. Since the laser light that drives this protrusion can be modulated very fast (e.g., time constants of less than about 1 nanosecond), the protrusion time constants can also be very fast. For a 500 nanosecond excitation, for example, the resulting frequency is 2 MHz. Time constants needed for air bearing modes in the 100-300 kHz range, for example, are 10-3.3 microseconds, respectively. This range is easily accessible with the laser heating induced in a HAMR recording system according to various embodiments. This range is not accessible using conventional methods.

The laser power level required to produce heat-induced modulation of a slider or other transducer component is lower than the recording power, so recorded tracks are not erased or impacted by the heat-induced slider modulation. In embodiments where the excitation is at resonance, a small input driving force can result in a large output, making heat-induced slider modulation very energy-efficient. As such, the increase in temperature of the head transducer is much smaller than head temperatures associated with writing operations.

Figure 1:
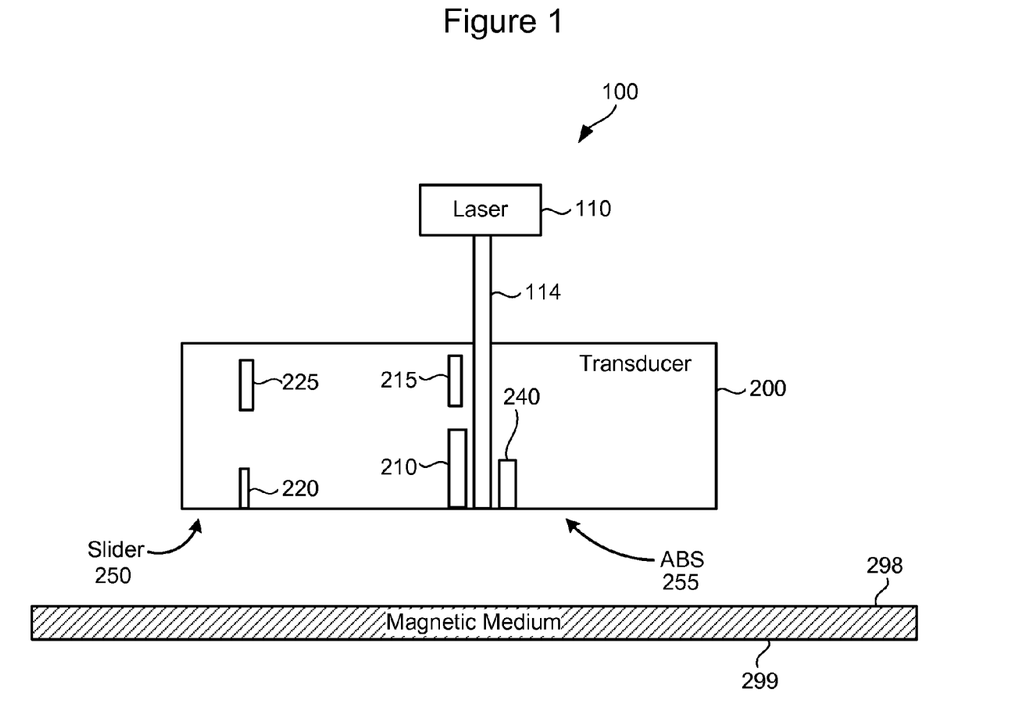
FIG. 1 is a cross-sectional view of a transducer comprising a laser arrangement according to various embodiments.

Referring now to FIG. 1, a block diagram shows a cross-sectional view of a head transducer 200 according to various embodiments. The representative components on the transducer 200 shown include a reader 220, a writer 210, a reader heater 225, and a writer heater 215. The transducer 200 may be used as a read/write head of a data storage device, such as a hard disk drive. The transducer 200 includes a slider 250 having a leading edge and a trailing edge. The writer 210 and reader 220 are typically located at the trailing edge of the slider 250 and maintained in a close spaced-apart relationship (e.g., 10 nm) when writing and reading data to and from a surface 298 of a magnetic storage medium 299, e.g., a disk. When the slider 250 is located over the surface 298 of magnetic storage medium 299, a flying height is maintained between the slider 250 and the surface 298 by a downward force. This downward force is counterbalanced by an air cushion (i.e., air bearing) that is created between the medium surface 298 and an air bearing surface (ABS) 255 of the slider 250 when the disk is rotating.

The transducer 200 shown in FIG. 1 also includes a laser arrangement 100. The laser arrangement 100 includes a waveguide 114 configured to optically couple a laser 110 (e.g., a laser diode) to an NFT 240 located at the air bearing surface 255 of the slider 250. According to the embodiment illustrated in FIG. 1, the laser 110 is situated externally of the head transducer 200, such as on a head suspension assembly (HSA). In some embodiments, the laser 110 is integral to the transducer 200. The laser 110 is electrically coupled to a power supply that is configured to turn the laser 110 off and on, and to modulate laser light produced by the laser 110 at a desired frequency. In various embodiments, the power supply is controlled by a processor, a controller or a control circuit, and has an output power that can be adjusted as desired. The power supply to the laser 110 can be configured to provide control for a variety of waveform parameters. For example, the power supply can be configured for some or all of the following waveform parameters: output power (amplitude) of the laser light, frequency of the laser light modulation, phase of the laser light modulation, pulse width of laser light pulses and/or duty cycle of the laser light pulses. This list is non-exhaustive, and it will be appreciated that the power supply can be configured to control various additional or alternative waveform parameters.

As was previously discussed, laser light produced by the laser 110 is coupled to the NFT 240 via the waveguide 114. The NFT 240, in response to the incident laser light, generates a high power density in a near-field region that is directed to the magnetic storage medium 299. This high power density in a near-field region of the NFT 240 causes an increase in local temperature of the medium 299, thereby reducing the coercivity of the magnetic material for writing or erasing information to/at the local region of the medium 299. A portion of the laser light energy communicated to the NFT 240 is absorbed and converted to heat within the slider 250. This heating results in thermal expansion, protrusion at the air bearing surface 255, and a change in both head-media clearance and head-media separation. In addition to the NFT 240, the transducer 200 typically includes additional heat sources that can cause further expansion and protrusion of the air bearing surface 255. Such additional heat sources, when active, include one or more of the writer 210 (writer coil), writer heater 215, and reader heater 225.

Figure 2A:
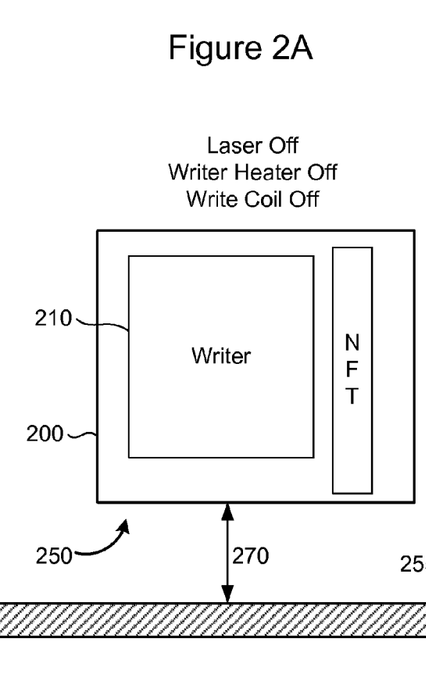
FIGS. 2A-2C show more detailed views of a protrusion region of a transducer slider resulting in a decrease in head-media separation between the transducer and a magnetic medium.
Figure 2B:
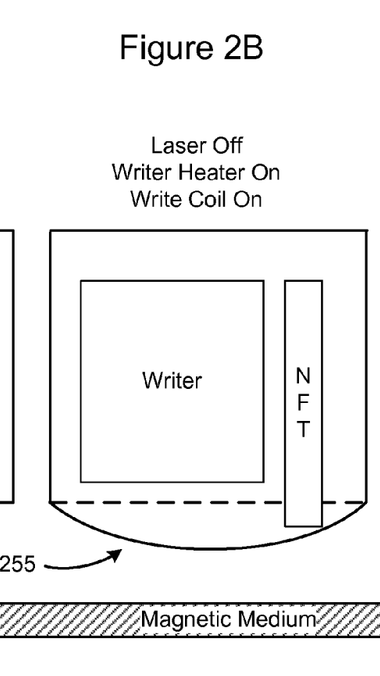
Figure 2C:
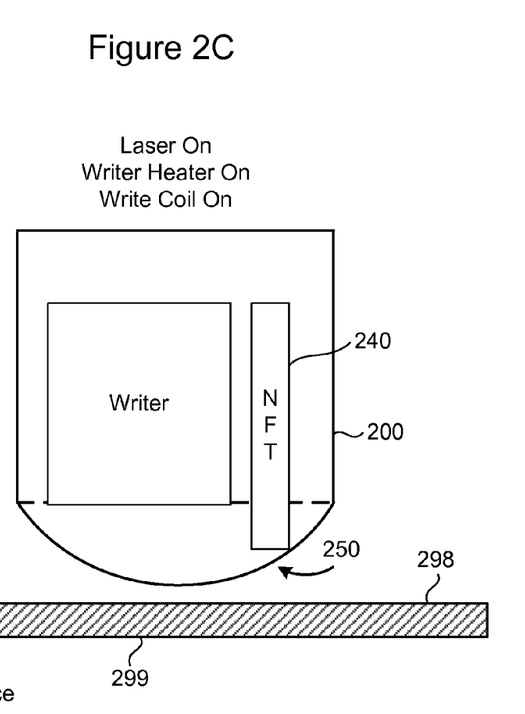

FIGS. 2A-C are simplified side views of a writer portion of the head transducer 200 illustrated in FIG. 1. FIGS. 2A-C show general protrusion progression of the slider 250 in response to activation of different heat sources within the head transducer 200. These different heat sources include the write coil of the writer 210, the writer heater 215 (not shown for simplicity), and the laser 110 (not shown for simplicity) which produces the optical energy converted to heat by the NFT 240.

In FIG. 2A, the head transducer 200 is shown in a non-thermally actuated state. In this state, the laser 110, writer heater 215, and writer coil 210 are all off. Thus, the head transducer 200 attains a default, non-actuated shape/state establishing a default distance between the air bearing surface 255 of the head transducer 200 and the surface 298 of the magnetic storage medium 299. This default distance is illustrated by an air gap 270.

FIG. 2B illustrates the head transducer 200 in a partial-thermally actuated state. In this state, the writer heater 215 and the writer coil 210 are on, but the laser 110 is off. In response to the active writer heat sources, the writer-related elements (write and/or return pole, NFT) expand, causing the air bearing surface 255 to protrude into the air gap 270. Thus, the air gap 270 and the distance between air bearing surface 255 and the medium surface 298 decreases. The dashed line indicates the default state/shape of air bearing surface 255 depicted in FIG. 1. As can be seen, activation of the two writer heat sources causes the writer elements and adjacent head transducer materials to protrude beyond the default shape of the head transducer 200.

The magnitude of air bearing surface protrusion of the head transducer 200 is furthered increased by the additional activation of the laser 110, as shown in FIG. 2C. The additional heat produced by the NFT 240 in response to the incident laser light further expands the air bearing surface 255, causing the air bearing surface 255 to protrude further into air gap 270. It can be seen in FIGS. 2A-C that the stroke, or magnitude, of the air bearing surface protrusion along the cross track direction (z-axis) of the head transducer 200 changes in size and shape with introduction and removal of heat to/from the air bearing surface 255.

Figure 3:
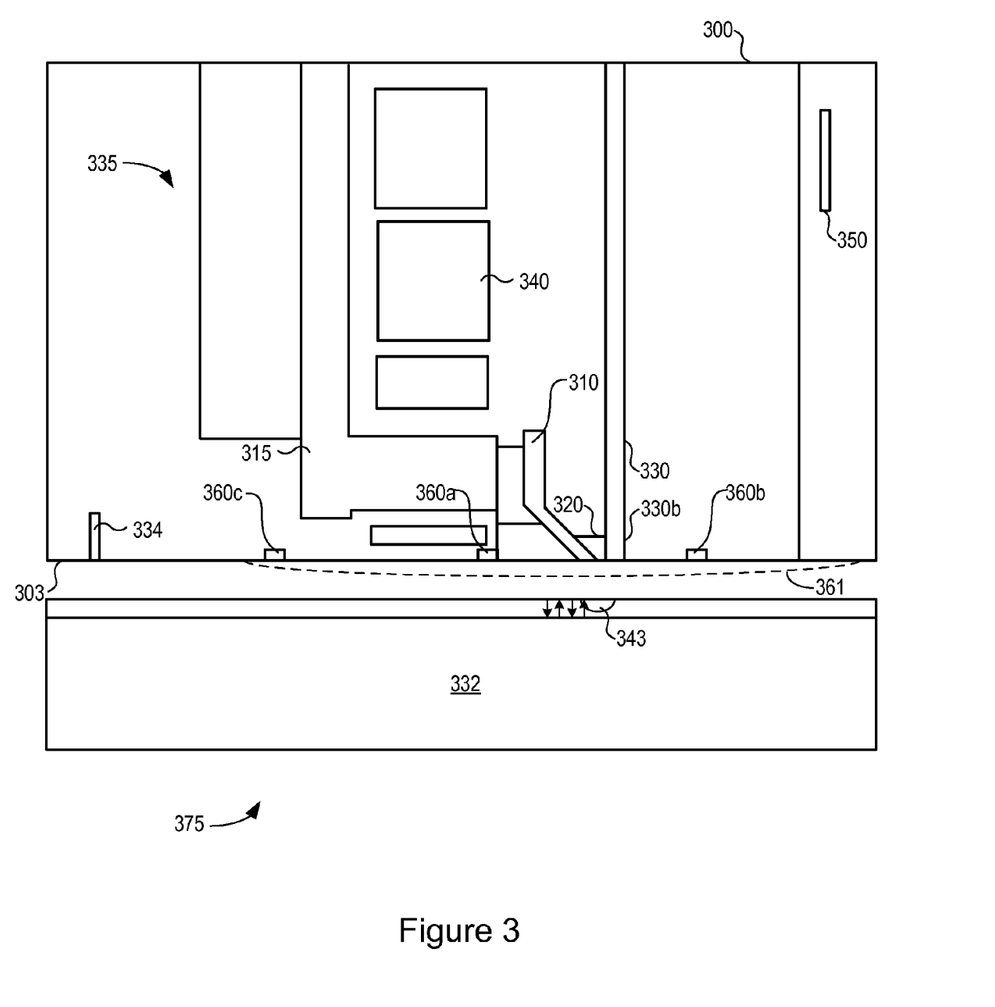
FIG. 3 shows detailed structures and features that may be included in a transducer comprising a laser arrangement in accordance with various embodiments.

FIG. 3 depicts detailed structures and features that may be included in a HAMR transducer in accordance with various embodiments. FIG. 3 shows a cross-section of a head transducer 300 in accordance with various embodiments. An NFT 320 is located between a write pole 310 and a waveguide 330. The portion of head transducer 300 illustrated in FIG. 3 includes three heat sources; a write coil 340, NFT 320, and a heater 350, that cause a thermal protrusion, indicted by dashed line 361.

One or more thermal sensors, e.g., TCR sensors, can be located within a protrusion region at one or more optional locations, as shown in FIG. 3. FIG. 3 shows optional thermal sensors 360a, 360b, 360c located at different locations within the region of protrusion 361. In many embodiments only one thermal sensor is used. In some embodiments, as illustrated by thermal sensor 360a, a thermal sensor is located in the region of the writer 335, near the write pole 310, return pole 315, and the NFT 320. In one configuration, at least a portion of thermal sensor 360a is co-extensive with a portion of the return pole 315 along an axis normal to the air bearing surface. Thermal sensor 360a is situated in an uptrack/downtrack direction from at least one of the NFT 320 and write pole 310. In some configurations, a thermal sensor is located outside the region of the writer 335. For example, thermal sensor 360b is located at a second optional location within the protrusion region of the air bearing surface and adjacent the write pole 310 (but outside of the writer components) on a side of the writer 335 opposite the reader 334. Thermal sensor 360b is located between a waveguide 330, which is optically coupled to NFT 320, and heater 350 (e.g., positioned nearer to waveguide 330 than heater 350). Thermal sensor 360c illustrates a third optional location within the protrusion region of the air bearing surface and adjacent the return write pole 315 (but outside of the writer components) between the writer 345 and the reader 334.

It is understood that thermal sensor can be located elsewhere relative to write pole 310 and NFT 320 yet still be located within a protrusion region of these components. For example, thermal sensor can be located between write pole 310 and a coil 340 that energizes the write pole 310.

According to some embodiments, a protrusion region can be a region of the air bearing surface 303 between the write pole 310 and a write return pole 315; between a write return pole 315 and NFT 320, and/or between write return pole 315 and a waveguide 330. In other embodiments, a protrusion region can be considered a region of ABS 303 originating at a heat source, such as NFT 320, write pole 310, and/or heater and extending generally outwardly from about 1-3 micrometers around the heat generating element(s). In FIG. 3, the ABS protrusion is indicated by dashed line 361, and the location of maximum ABS protrusion can occur at or between NFT 320 and write pole 310, for example. The protrusion region can be considered a region of ABS 303 extending outwardly from an location of maximum protrusion to locations that expand by at least a predetermined percentage of maximum ABS protrusion (e.g., 50%, 60%, 70%, 80%, 90%). In some embodiments, the protrusion region is defined by a region of ABS 303 that protrudes at least 80% relative to a region of maximum protrusion of ABS 303. In other embodiments, the protrusion region is defined by a region of ABS 303 that protrudes at least 90% relative to a region of maximum protrusion of ABS 303.

The head transducer 300 may comprise a relatively thick substrate on which is disposed the multiplicity of thin layers. The layers cooperate to define the respective components of the head transducer 300. The layers include a multiplicity of layers tailored to form, for example, a magnetic writer 335 and a magnetic reader 334. The layers may also be patterned to form coils 340 which, when energized with an electrical current, produce a magnetic field passes through the writer 335 and through a portion of the writeable medium 375. One end or terminus 310 (referred to as a write pole) of the writer 335 may be configured to produce a high flux density of the magnetic field. Another end or terminus 315 (referred to as a return pole) of the writer 335, coupled to the write pole 310 via a yoke of the writer, may be configured to produce a lower flux density.

The layers of the head transducer 300 also include layers tailored to form a (passive) waveguide 330, an NFT 320, and the thermal sensor shown in FIG. 3 at optional locations as sensor 360*a*, 360*b*, 360*c*. A laser (not shown in FIG. 3) may be formed in the head transducer layers, may be mounted on the heat transducer or may be disposed in a cavity in the head transducer and is optically coupled to the NFT 320 through the waveguide 330.

The writeable medium 375 may be configured in any known way, but typically it includes a plate or substrate 332 on which at least a hard magnetic layer 344 is deposited or otherwise formed. A small portion or spot 343 of the layer 344 may be heated sufficiently to reduce the coercivity of the material enough so that the magnetic field from the magnetic write pole 310 is strong enough to change the magnetization direction of the recording layer 344. Bits of information may then be recorded in the form of a perpendicular upward downward magnetization direction for a series of magnetic domains in the layer 344.

The heating of the spot 343 in connection with the write procedure may be provided directly by the NFT 320 and indirectly by the laser. When the laser is energized, laser light is emitted from the laser is coupled into the waveguide, whether by end-fire coupling or otherwise. The laser light is conveyed to a distal end 330*b* of the waveguide 330. In some cases, the distal end may correspond to a focal point or focal region of a solid immersion mirror (SIM) or a solid immersion lens (SIL). Located at or near the distal end 330*b* is the NFT 320, which may be formed as part of the plurality of layers. The NFT 320 utilizes plasmons to convert the power density of the incident laser light into a high power density in a near-field region that is typically smaller than the diffraction limit for the laser light. The high power density provided by the NFT 320 in the near-field region is absorbed by the nearby writeable medium 375 to produce localized heating of the spot 343. By positioning an emitting end of the NFT 320 close enough to the write pole 310 of the writer 335, at least a portion of the heated spot 343 can be exposed to the high magnetic flux emitted by the write pole 310 before passing out of range (due to the relative motion of the writeable medium 375) so that the magnetic field at the write pole 310 is capable of changing the magnetization direction of the spot 343.

The heating of spot 343 also causes protrusion (indicated by dashed line 361) of a region of the air bearing surface 303 of the head 300. To measure the temperature change and corresponding protrusion, one or more thermal sensors, e.g., one or more of thermal sensors 360*a*, 360*b*, 360*c* can be located proximate the NFT 329 and/or write 310 or return 315 poles in a protrusion region. FIG. 3 shows optional locations for a thermal sensor. Thermal sensor 360*a* is located at a first optional location within the protrusion region of the air bearing surface and within the writer 335, e.g., between the write return pole 315 and write pole 310; thermal sensor 360*b* is located at a second optional location within the protrusion region of the air bearing surface and adjacent the write pole 310 (but outside of the writer components); and thermal sensor 360*c* is located at a third optional location within the protrusion region of the air bearing surface and adjacent the return write pole 315 (but outside of the writer components.)

The NFT 320 may be a suitably sized pin or other structure and may be made of a metal such as gold or other suitable materials. The NFT 320 may have any suitable design known in the art. The NFT 320 is shown in FIG. 3 to be close to but separated from waveguide 330, but in other embodiments the NFT may be disposed within the waveguide 330. In still other embodiments, the laser may be integrated into the head transducer and the waveguide may be omitted. In an integrated laser configuration, the NFT may couple directly to the integrated semiconductor laser.

Figure 4A:
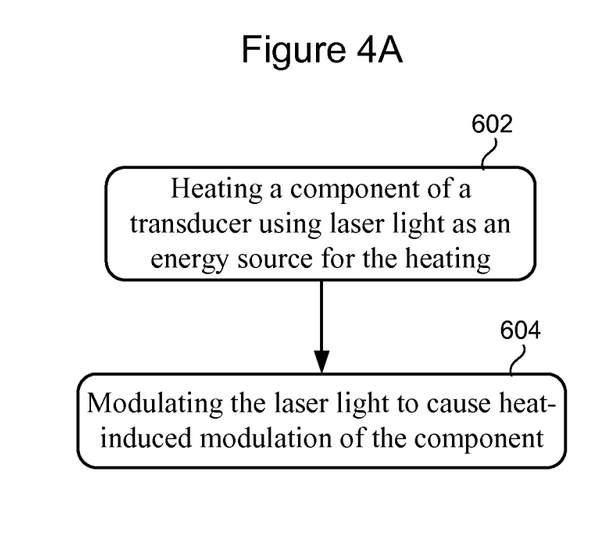
FIG. 4A shows processes involving heating of a transducer component using modulated laser light as an energy source for the heating in accordance with various embodiments.
Figure 4B:
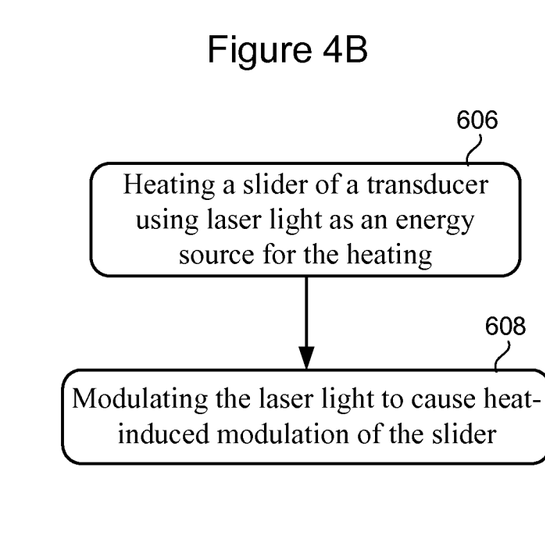
FIG. 4B shows processes involving heating of a slider using modulated laser light as an energy source for the heating in accordance with various embodiments.
Figure 5:
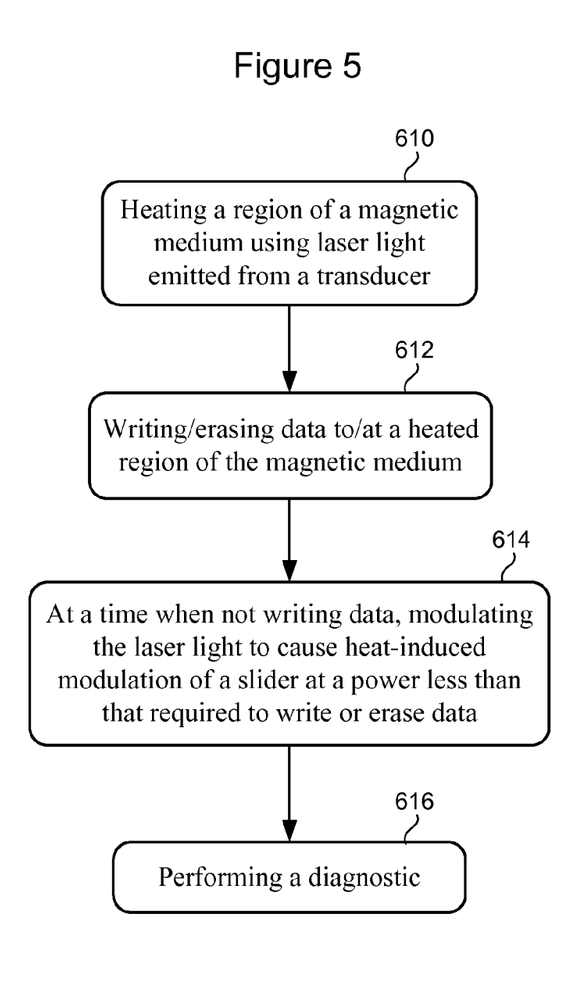
FIG. 5 shows processes involving heating of a slider using modulated laser light as an energy source for the heating in accordance with various embodiments.

FIGS. 4A, 4B, and 5 illustrate various processes in accordance with various embodiments. The processes illustrated in FIGS. 4A, 4B, and 5 can be implemented, for example, using the apparatuses shown in FIGS. 1-3. According to FIG. 4A, a mechanical component of a transducer is heated 602 using laser light as an energy source for the heating. The laser light is modulated 604 to cause heat-induced modulation of the transducer component, such as at a frequency of a resonant mode of the mechanical component.

In accordance with FIG. 4B, a slider of a transducer is heated 606 using laser light as an energy source for the heating. The laser light is modulated 608 to cause heat-induced modulation of the slider, such as at a frequency of a resonant mode of an air bearing defined between the slider and a magnetic storage medium.

According to the embodiment shown in FIG. 5, a region of a magnetic medium is heated 610 using laser light emitted from a transducer. The laser light has a power sufficient to lower a coercivity of the magnetic material at the region of the magnetic medium, such as to zero. Data is written 612 to the heated region of the magnetic medium. In some cases, the heated region of the magnetic medium can be subject to erasure. At a time when not writing data, the laser light is modulated 614 to cause heat-induced modulation of the slider at a power that is less than that required to write or erase data. A diagnostic is then performed 616.

It is desirable to maintain a predetermined slider flying height over a range of disk rotational speeds during both reading and writing operations to ensure consistent performance. To account for both static and dynamic variations that may affect slider flying height, the transducer may be configured such that the slider geometry can be configurably modified during operation in order to finely adjust the head-media separation (see, e.g., FIGS. 2A-C). The ability to alter the shape and deflection magnitude of the transducer in response to temperature change may be due, for example, to a region of the transducer (e.g., slider or region near or at the air bearing surface) being formed from differing materials. In such a case, changes in temperature causes a deformation in this region due to different thermal expansion properties of the respective materials. Selective application of heat to the slider, for example, can be used to finely adjust the effective head-media separation and clearance of the transducer.

Figure 6:
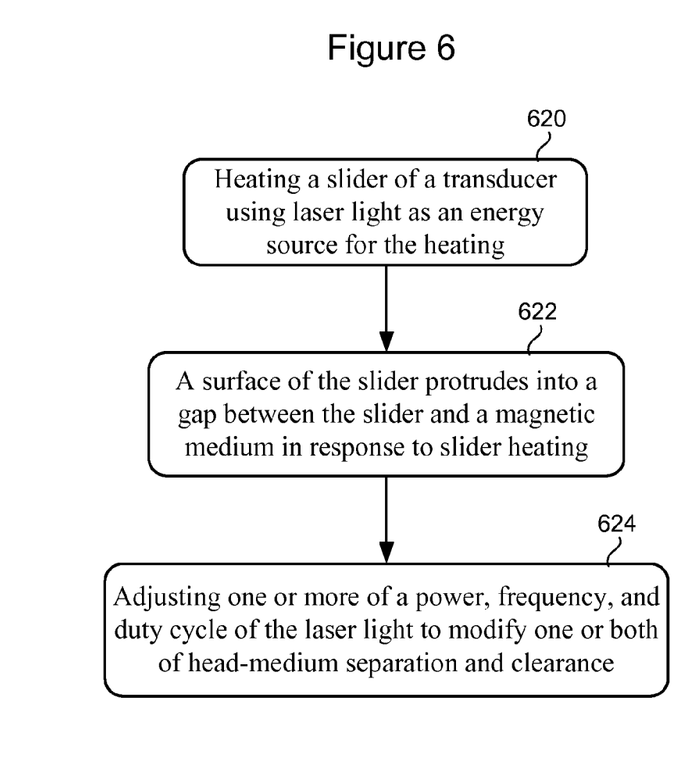
FIG. 6 shows processes involving heating a region of a magnetic medium during writing and erasing procedures, and heating of a transducer slider using modulated laser light as an energy source for the heating in accordance with various embodiments.

FIG. 6 shows various processes in accordance with embodiments described herein. The processes illustrated in FIG. 6 can be implemented, for example, using the apparatuses shown in FIGS. 1-3. According to FIG. 6, a slider of a transducer is heated 620 using laser light as an energy source for the heating. At least a portion of the slider surface protrudes 622 into a gap defined between the slider and a magnetic medium in response to slider heating. The method of FIG. 6 further involves adjusting 624 one or more of power, frequency, and duty cycle of the laser light to modify one or both of head-medium separation and clearance. In some embodiments, laser-induced writer protrusion can be controlled by appropriate control of the laser light to expand a protrusion region at the writer by an additional 2-5 nm.

Head-media separation can be measured in various ways. According to some embodiments, the amplitude of a written pattern on the magnetic storage medium is measured as the reader of the transducer is brought closer to the medium surface. A decrease in head-media separation correlates to an increase in reader signal amplitude. According to various embodiments, contact between the slider and the medium surface can be detected using this approach, since the reader signal amplitude cannot increase once the transducer is in contact with the medium surface.

One or more other sensors may be employed in the transducer. The response of the one or more sensors may be used to sense contact with the magnetic storage medium and/or to detect head-media separation and clearance of the slider during operation. For example, some contact detection techniques involve applying a DC bias to a sensor and attempting to detect relative changes in resistance as power to a heater is varied. As the slider comes into contact with the media surface, friction may generally cause an increase of the sensor resistance due to an increase in temperature. However, DC resistance measurements are sensitive to noise, and it may require a large number of samples before DC resistance can be estimated. This may make the response of the system unacceptably slow. Also, the sensitivity of this technique may significantly depend on the actuation efficiency of the heater, which can make it more difficult to consistently set contact threshold over changes in air bearing conditions. For example, a difference in contact response between air bearing designs might purely be from efficiency differences between the heaters.

Another contact detection technique involves measuring root-mean-squared (RMS) power of the sensed resistance (or voltage) readings of the sensor 120. Mechanical and thermal perturbations occur due to slider-to-disk contact, and these perturbations can be detected in the form of a signature (e.g., an increase) in the RMS value of the sensor output. One contact detection method involves applying power to a heater with a steady or DC waveform. The amplitude of the DC waveform is gradually increased to bring the slider into contact with the disk. Contact can be determined by measuring the induced vibrations from contact the head with the disk or by a sudden resistance change due to changing thermal boundary conditions.

In some embodiments, a thermal sensor is incorporated in the transducer. The thermal sensor can be any of a variety of thermal sensor types, such as a resistance temperature sensor that as a resistance temperature sensor that has a temperature coefficient of resistance (referred to herein as a TCR sensor). One example of a useful TCR sensor is a dual-ended TCR sensor (referred to herein as a DETCR sensor). A TCR sensor measures temperature change by measuring the change in resistance, or rate of change in resistance, across the sensor. Other useful thermal sensors include varistors and thermocouples, for example. The thermal sensor measures the temperature change at the air bearing surface of the transducer induced by all thermal condition changes from air pressure, clearance, head operation, and contact, among other changes.

In various embodiments, two or more heat sources of the transducer can be controlled to adjust head-media separation as desired. In addition to an NFT coupled to a laser, a transducer may also include one or more heaters (e.g., resistance heaters) for the reader and/or the writer, and may be provided with selectable amounts of current by a processor or controller. During write operations, the write coil defines another heat source of the transducer. In accordance with various embodiments, one or more of transducer fly height, head-medium separation, and clearance can be adjusted using a combination of transducer heat sources. In some embodiments, laser-induced slider heating can be used together with heating from the writer heater to control one or more of transducer fly height, head-medium separation, and clearance. In other embodiments, laser-induced slider heating can be used together with heating from the writer heater and the writer coil to control one or more of transducer fly height, head-medium separation, and clearance. In further embodiments, laser-induced slider heating can be used together with heating from the writer heater and one or both of the reader heater and writer coil to control one or more of transducer fly height, head-medium separation, and clearance. In yet another embodiment, laser-induced slider heating can be used as the sole source of slider heating to control one or more of transducer fly height, head-medium separation, and clearance.

It is understood that heat sources that impact transducer flying characteristics other than those described above can be controlled in combination with one or more of the transducer heat sources disclosed herein in accordance with various embodiments. Also, non-thermal devices (e.g., piezoelectric devices) may also cause transducer/slider deformation/deflection, and can be controlled in combination with one or more heat sources for purposes of adjusting one or more of transducer fly height, head-medium separation, and clearance in accordance with some embodiments.

According to various implementations, the laser light can be modulated to produce heat-induced mechanical modulation of a slider or other transducer component at a frequency ranging from about 10 kHz to about 1 MHz. In some implementations, the laser light can be modulated to produce heat-induced mechanical modulation of a slider or other transducer component at a frequency ranging from about 50 kHz to about 400 kHz. In other implementations, the laser light can be modulated to produce heat-induced mechanical modulation of a slider or other transducer component at a frequency ranging from about 100 kHz to about 300 kHz.

In further implementations, the laser light can be modulated at a low frequency to produce heat-induced mechanical modulation of a slider or other transducer component at a frequency ranging from about 70 Hz to about 1 kHz. In some implementations, the laser light can be modulated at a low frequency to produce heat-induced mechanical modulation of a slider or other transducer component at a frequency ranging from about 1 kHz to about 10 kHz. In some embodiments, the laser light is modulated at a duty cycle in the range of about 10% to about 90%. In other embodiments, the laser light is modulated at a duty cycle in the range of about 40% to about 60%. Various waveform parameters can be modulated to produce heat-induced mechanical modulation of a slider or other transducer component in addition to, or as an alternative to, the frequency and duty cycle modulation discussed above. For example, pulse width modulation, phase modulation, and/or other suitable types of waveform modulation may be used.

In some embodiments, a resonance condition is established and changes are monitored in resonance amplitude or frequency. This may lead to a high signal-to-noise ratio and, in many cases, a faster response time. In magnetic disk-based recording systems, for example, vertical motion of the reader is used to produce a modulated read signal. The air bearing resonant modes can be used because they cause motion of the primary sensors and transducers in the recording system. If the vertical mode of the air bearing were excited, for example, the reader, the writer, and the NFT would undergo an oscillating spacing change and would enable several potential methods of measuring the displacement. Amplitude-modulated laser light can be used to cause the slider to oscillate at air bearing resonant frequencies.

Figure 7:
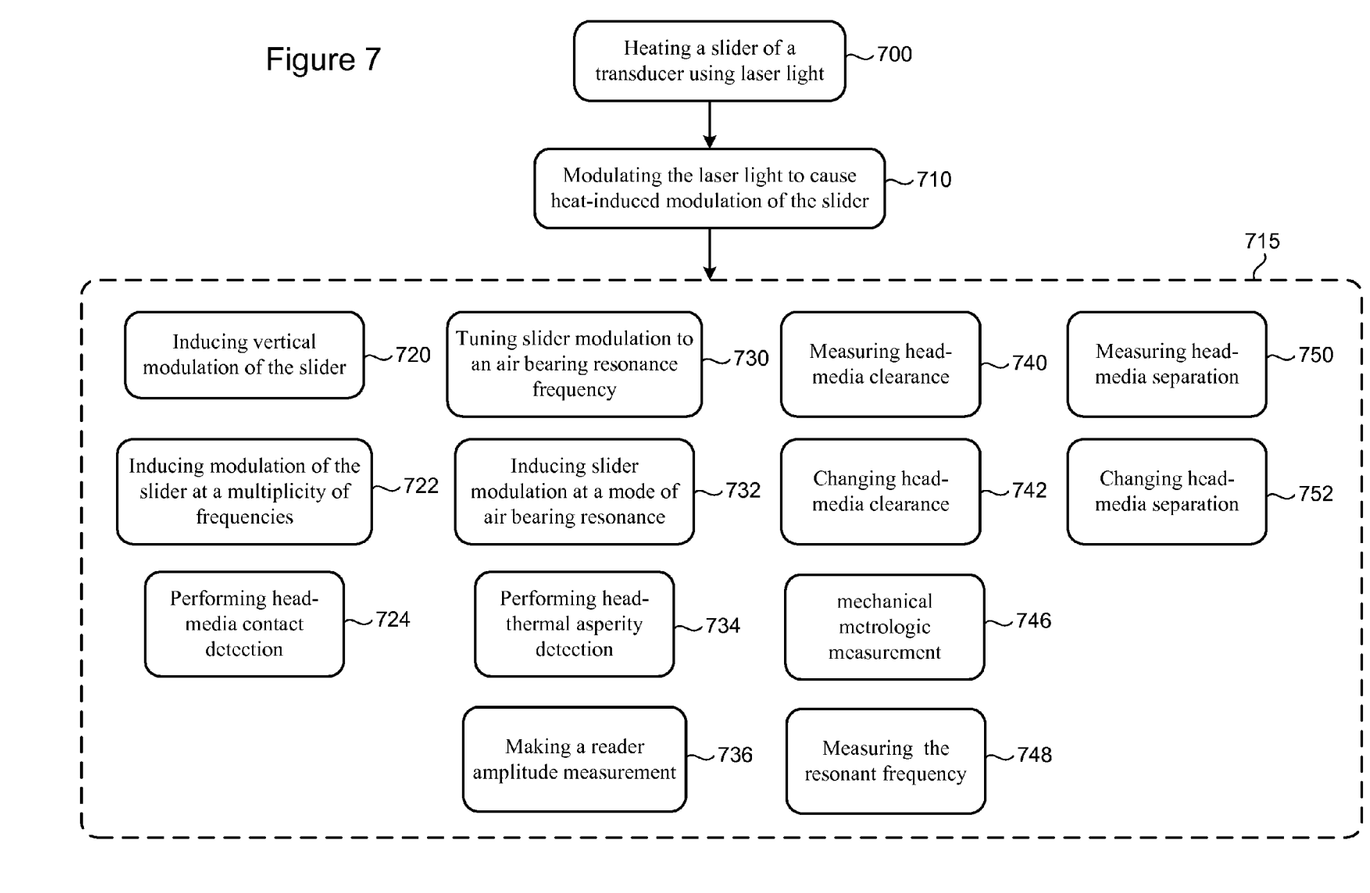
FIG. 7 shows various procedures that can be implemented in conjunction with heat-induced modulation of a slider in accordance with various embodiments.

FIG. 7 shows various processes that can be implemented in conjunction with heat-induced modulation of a transducer slider in accordance with various embodiments. The various processes shown in FIG. 7 involve heating 700 a slider of a transducer using laser light as a heating source. The laser light is modulated 710 to cause heat-induced modulation of the slider at a desired frequency. One or more of the processes shown in the dashed box 715 can be performed.

According to various implementations, vertical modulation of the slider is induced 720. The modulation may be induced by the laser light, as described above. The modulation may be induced 722 at a multiplicity of frequencies. Vertical or other modulation may be induced in other components of an HDD recording system. For example, modulation may be heat-induced in the gimbal assembly, the suspension, and/or the disk, for example. Additionally or alternatively, head-media contact detection can be performed 724, such as in a manner described hereinabove.

Heat-induced modulation of the slider may be tuned 730 to an air bearing resonance frequency, such as in a manner previously discussed. The slider may be induced 732 to modulate at a mode of air bearing resonance. This allows the slider to oscillate at larger amplitudes than at other frequencies, thereby increasing the SNR of the measurement. Other components of the system may additionally or alternatively be tuned and or induced to modulate at an air bearing resonance frequency or other resonant mode.

In accordance with various embodiments, head-thermal asperity contact detection can be performed 734. Thermal asperity detection can be done using a resistance temperature sensor assembly (e.g., DETCR), for example. Reader amplitude measurement can be performed 736. The reader amplitude can be determined, for example, by measuring 750 the head-media separation and/or measuring 740 the head-media clearance resulting from the heat-induced modulation of the slider. The head media separation and/or the head media clearance can be changed 742, 752, for example, if it is determined that the clearance and/or separation is beyond a predetermined threshold. In some cases, a mechanical metrologic measurement is performed 746 using heat-induced modulation of the slider. According to various aspects, the resonant frequency of the air bearing and/or other head components can be measured and/or may be monitored 748 by periodically re-measuring the resonant frequency.

Example 1

The following example summarizes an investigation of heat-induced slider modulation in accordance with various embodiments. This example is provided for purposes of illustration, and not of limitation.

The following data was taken from a free-space laser HAMR component with acoustic emission (AE) and laser doppler velocimetry (LDV) modulation sensing, both of which detect vibration or modulation. In this illustrative example, the LDV was configured to measure the vertical motion of the trailing edge of the slider. The laser light was modulated using an arbitrary waveform generator, which allowed the excitation frequency to be varied over a wide range. The response time of the laser was 500 nanoseconds, which corresponds to a frequency of 2 MHz.

Figure 8A:
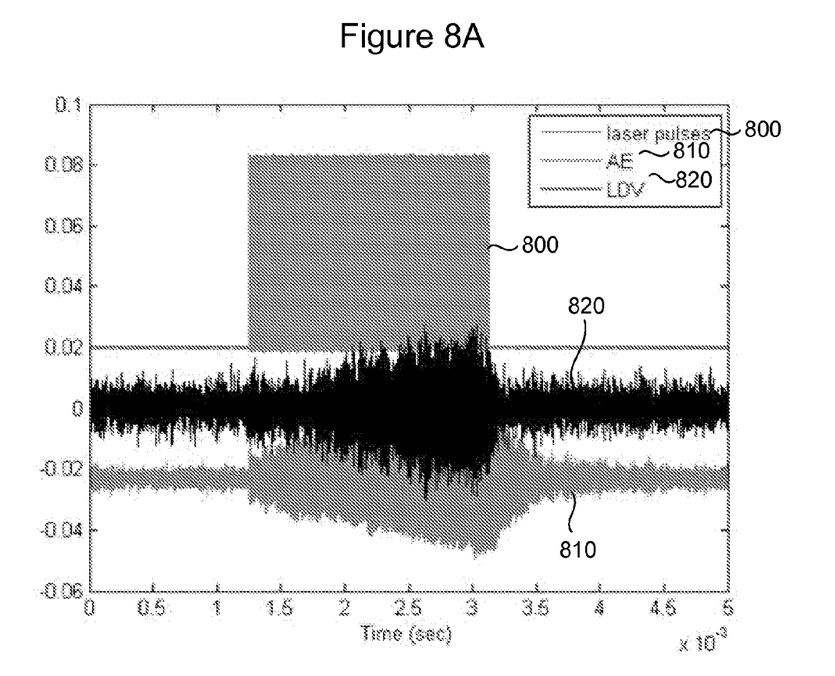
FIGS. 8A, 8B and 9-11 show example data in accordance with various embodiments.
Figure 8B:
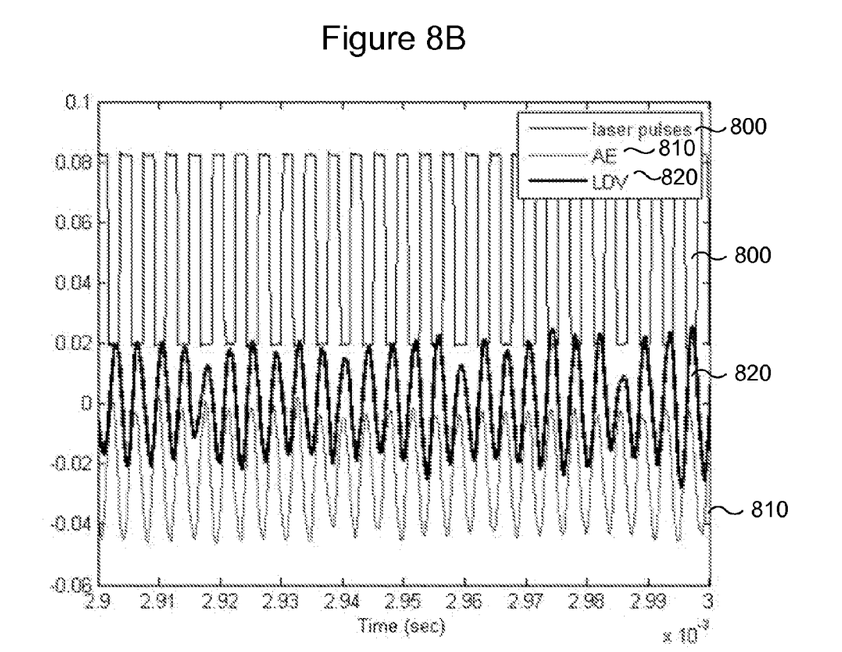

FIG. 8 is a plot of the laser waveform 800 and measurements of the slider response: LDV 820 and AE 810. In FIG. 8, the LDV-measured vertical modulation and the AE measured system vibration are plotted as a function of time. It can be seen in FIG. 8 that LDV 820 and AE 810 grow during the 2 milliseconds that the laser is exciting the slider and then decay when the laser is shut off. Along with the two modulation signals 810 and 820, the waveform 800 from the waveform generator is plotted. In this case, the laser power was 13.5 mW, significantly smaller than the power needed to heat media to the Curie temperature. When the modulation begins, the slider response is relatively small, but the amplitude grows over time, typical of an oscillatory system driven at resonance. The amplitude continues to grow during the 2 milliseconds that the laser is on, and then the modulation decays back to the unexcited state. In this case, the modulation frequency was at the slider vertical mode, 265 kHz. FIG. 8B is a zoomed-in view of FIG. 8A showing in more detail how the laser pulses drive the slider oscillation.

Figure 9:
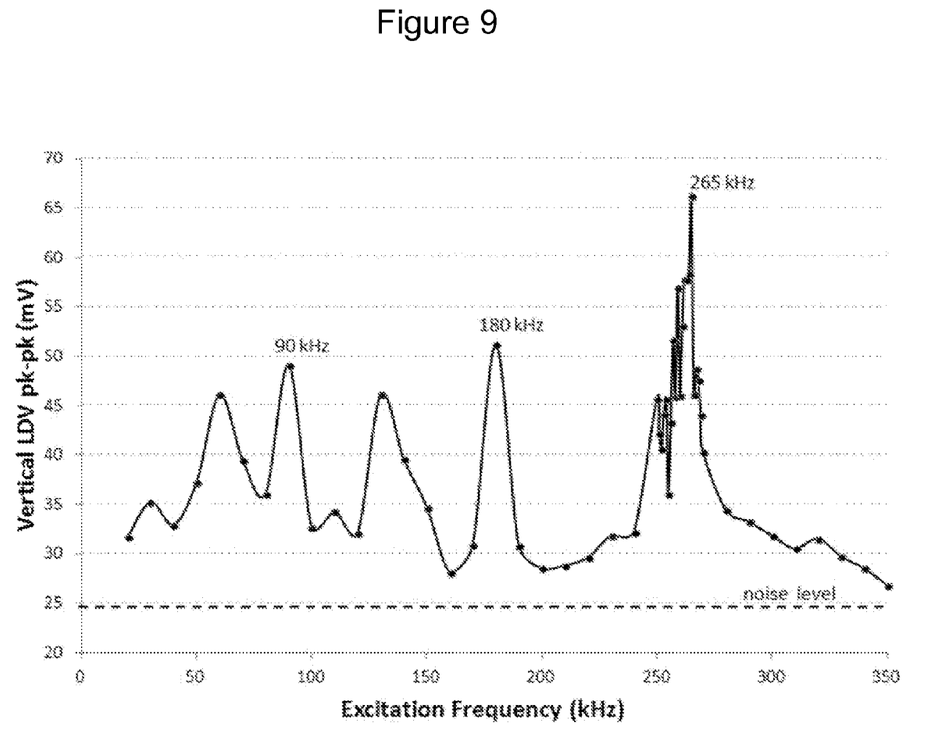

FIG. 9 shows vertical modulation of the trailing edge of the slider due to a square wave modulation of the laser power as a function of laser excitation frequency. In FIG. 9, the frequency of the waveform generator was swept through the relevant range and the response was measured. Several resonant peaks are observed, the largest being at the air bearing vertical mode, 265 kHz. Other modes include a mode at 90 kHz and a harmonic at 180 kHz.

Figure 10:
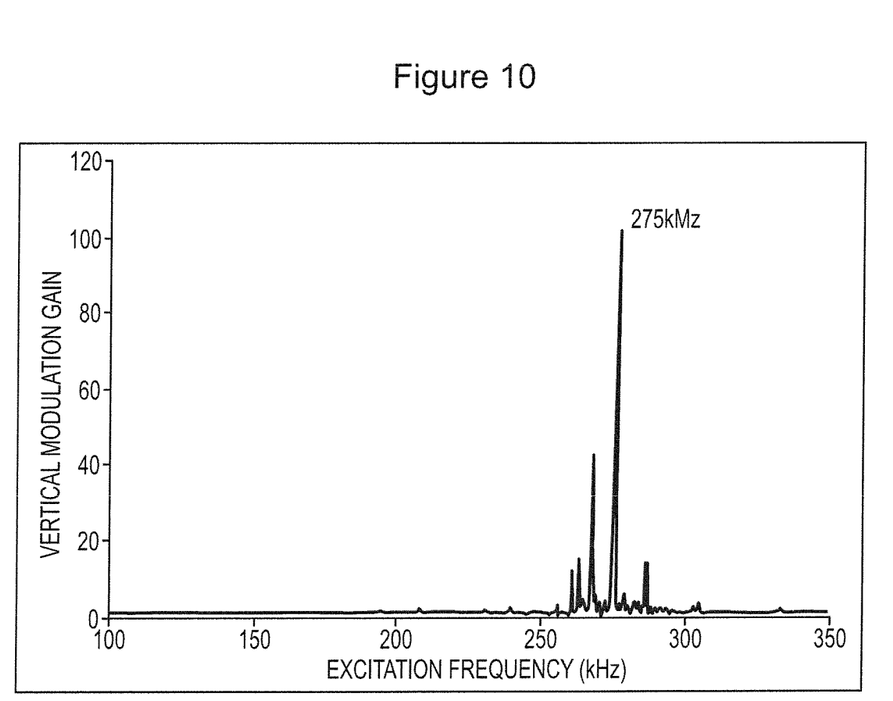

For purposes of comparison, FIG. 10 shows modeling results for the modulation of an air bearing that is nearly identical to the air bearing used in this evaluation. In FIG. 10, the primary vertical modulation peak is found at 275 kHz, which is very close to the peak observed in FIG. 9 (i.e., at 265 kHz). The difference in resonance frequency can be attributed to the slight difference in air bearing design, to imperfections in the built part and/or to differences between the test and modeled conditions.

Example #2

In addition to vertical LDV measurements, a second method of confirming the slider is oscillating was used. If the slider were modulating, it would also reduce the heater power needed to make contact. The amount of heater power required to make contact was measured while the slider was being excited by a 265 kHz square wave driving the laser. As the laser power increases, the amount of heater power needed to make contact is reduced, indicating that the amount of modulation is increasing.

Figure 11:
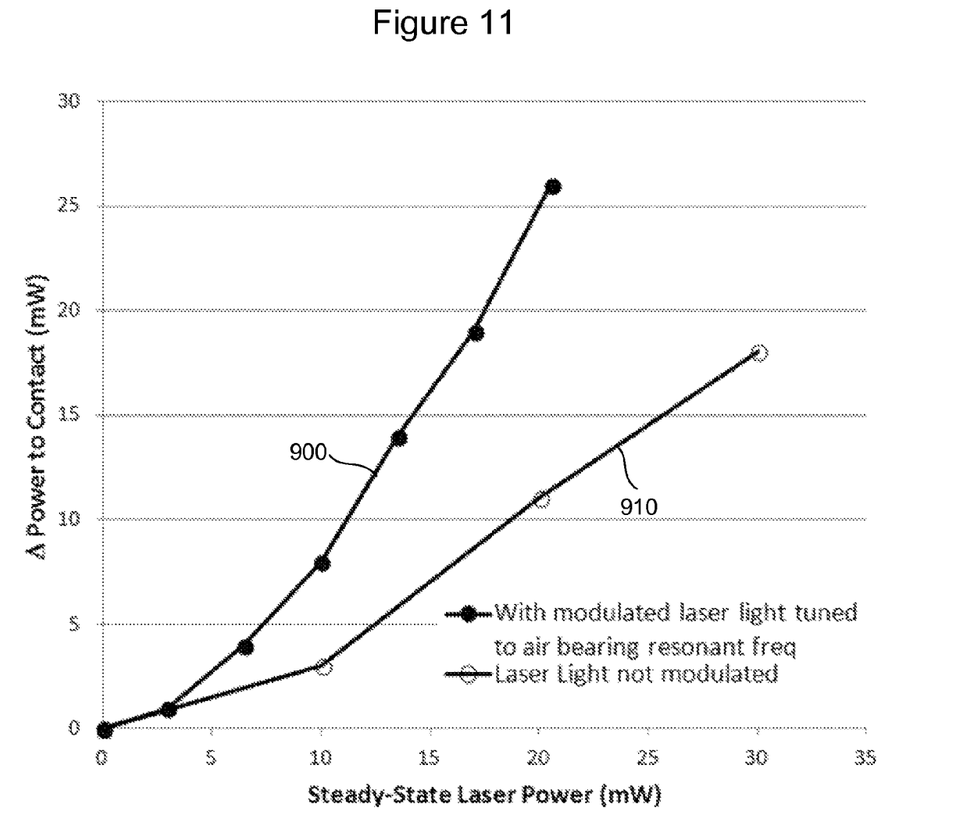

The amount of heater power reduction due to the square wave is plotted is in FIG. 11. Two curves 900 and 910 are plotted. FIG. 12 shows the reduction in heater power to contact as a function of laser power for the laser being modulated by a 265 kHz square waveform 900 and by a continuous 'DC' wave 910. The curve 900 corresponds to the reduction due to the laser square waver modulation at 265 kHz, while the curve 910 corresponds to the reduction due to continuous DC laser power. For the DC laser scenario, the power to contact difference is due solely to protrusion of the slider, while for the square wave, the difference is due to a small degree to protrusion, but to a much greater degree, slider modulation. The larger reduction in power to contact for the 265 kHz waveform indicates that the magnitude of slider modulation is significant.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
a transducer;
an air bearing defined between the transducer and a magnetic medium; and
a laser arrangement configured to cause heat-induced modulation of a component of the transducer, wherein the laser arrangement comprises a laser configured to produce modulated laser light at a frequency that mechanically excites the component at a resonant frequency and at a power lower than a power for writing data to or erasing data at the magnetic medium.

2. The apparatus of claim 1, wherein:
the transducer comprises a slider; and
the laser arrangement is configured to cause heat-induced modulation of the slider.

3. The apparatus of claim 1, wherein:
the laser arrangement comprises a near-field transducer proximate the component and configured to receive laser light; and
heat produced by the near-field transducer causes heat-induced modulation of the component.

4. The apparatus of claim 1, wherein:
the transducer comprises a slider;
the laser arrangement comprises a near-field transducer proximate the slider and configured to receive laser light; and
heat produced by the near-field transducer causes heat-induced modulation of the slider.

5. The apparatus of claim 1, wherein:
the laser arrangement comprises a laser and a waveguide optically coupled to the laser;
the waveguide is integral to the transducer; and
the laser is external of the transducer.

6. The apparatus of claim 1, wherein:
the laser arrangement comprises a laser and a waveguide optically coupled to the laser; and
the laser and the waveguide are integral to the transducer.

7. An apparatus, comprising:
a transducer comprising a slider;
an air bearing defined between the slider and a magnetic medium; and
a laser arrangement configured to:
heat a region of the magnetic medium in proximity to the slider; and
produce modulated laser light to cause heat-induced modulation of the slider, wherein the modulated laser light causes heat-induced modulation of the slider at a mode of air bearing resonance frequency.

8. The apparatus of claim 7, wherein the laser arrangement is configured to:
communicate laser light at a power that reduces a coercivity of magnetic material at the region for writing data to or erasing data at the region; and
communicate modulated laser light to cause heat-induced modulation of the slider at a power lower than the power for writing data to or erasing data at the magnetic medium.

9. The apparatus of claim 7, wherein:
the slider comprises an air bearing surface; and
the laser arrangement is configured to cause heat-induced modulation of at least a portion of the air bearing surface.

10. The apparatus of claim 7, wherein:
the laser arrangement comprises a near-field transducer proximate the slider and configured to receive laser light; and
heat produced by the near-field transducer causes heat-induced modulation of the slider.

11. The apparatus of claim 7, wherein the modulated laser light has a frequency in the range of about 100 KHz to about 400 KHz.

12. The apparatus of claim 7, further comprising a processor coupled to the transducer, wherein:
an air bearing is defined between the slider and the magnetic medium;
the transducer further comprises a reader or sensor configured to produce a signal indicative of changes in head-media separation; and
the processor is configured to measure a resonance frequency of the air bearing using the signal.

13. The apparatus of claim 7, further comprising a processor coupled to the transducer, wherein:
the transducer further comprises a reader or sensor configured to produce a signal indicative of changes in head-media separation; and
the processor is configured to measure changes in the head-media separation using the signal.

14. The apparatus of claim 7, further comprising a processor coupled to the transducer, wherein:

the transducer further comprises a reader or sensor configured to produce a signal indicative of head-medium contact; and the processor is configured to detect head-medium contact using the signal.

15. The apparatus of claim 7, further comprising a processor coupled to the transducer, wherein:

the transducer further comprises a reader or sensor configured to produce a signal indicative of head-media separation;

the processor is configured to measure one or both of head-medium separation and clearance using the signal; and the laser arrangement is configured to adjust one or more of a power of the laser light modulation, a frequency of laser light modulation, a pulse width of the laser light modulation and a duty cycle of the laser light modulation to modify one or both of head-medium separation and clearance.

16. A method, comprising:

heating a slider of a transducer-using laser light as an energy source for the heating;

modulating the laser light to cause heat-induced modulation of the slider;

measuring, using a processor and a reader or sensor configured to produce a signal indicative of head-media separation, a resonant frequency of an air bearing defined between the slider and a magnetic medium proximate the slider; and;

tuning a frequency of the laser light to cause heat-induced modulation of the slider at the resonant frequency of the air bearing.

17. The method of claim 16, wherein modulating the laser light causes vertical modulation of the slider.

18. The method of claim 16, wherein heating the slider comprises heating the slider using the laser light at a power lower than a power for writing data to or erasing data at the magnetic medium.

19. The method of claim 16, further comprising one or both of:

measuring changes in spacing between the slider and a magnetic medium proximate the slider; and detecting contact between the slider and the magnetic medium.

20. The method of claim 16, further comprising adjusting one or more of a power, frequency, and duty cycle of the laser light to modify one or both of head-medium separation and clearance.

21. The method of claim 16, further comprising heating a region of a magnetic medium proximate the transducer using the laser light, the laser light used to heat the magnetic medium region having a power that reduces a coercivity of magnetic material at the region for writing data to or erasing data at the region.

22. An apparatus, comprising:

a transducer comprising a slider and a reader or sensor configured to produce a signal indicative of changes in head-media separation;

an air bearing defined between the slider and a magnetic medium;

a laser arrangement configured to:

heat a region of a magnetic medium in proximity to the slider; and produce modulated laser light to cause heat-induced modulation of the slider; and a processor coupled to the transducer, the processor configured to measure a resonance frequency of the air bearing using the signal.

23. A method, comprising:

heating a slider of a transducer using laser light as an energy source for the heating;

modulating the laser light to cause heat-induced modulation of the slider at a frequency that matches a resonance frequency of an air bearing defined between the slider and a magnetic medium proximate the slider producing, by a reader or a sensor at the slider, a signal that is modulated in response to modulation of the slider; and detecting, using a processor coupled to the reader or sensor, one or both of head-media separation and head-media contact using the reader or sensor signal.

24. The method of claim 23, wherein heating the slider comprises heating the slider using the laser light at a power for writing data to or erasing data at the magnetic medium.

* * * * *